US 8,775,483 B2

(12) United States Patent
Antani et al.

(10) Patent No.: US 8,775,483 B2
(45) Date of Patent: *Jul. 8, 2014

(54) IN-MEMORY DATA GRID HASH SCHEME OPTIMIZATION

(75) Inventors: Snehal S. Antani, Hyde Park, NY (US); Kulvir S. Bhogal, Pfugerville, TX (US); Nitin Gaur, Round Rock, TX (US); Chris D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,180

(22) Filed: Mar. 5, 2012

(65) Prior Publication Data

US 2012/0303675 A1 Nov. 29, 2012

Related U.S. Application Data

(63) Continuation of application No. 13/115,662, filed on May 25, 2011.

(51) Int. Cl.
*G06F 17/30* (2006.01)
*G06F 7/00* (2006.01)
*G06F 17/00* (2006.01)

(52) U.S. Cl.
CPC .......... *G06F 17/3033* (2013.01); *Y10S 707/966* (2013.01)
USPC ............................ 707/809; 707/812; 707/966

(58) Field of Classification Search
CPC ............ G06F 17/300094; G06F 17/30194; G06F 17/30566; G06F 17/30949
USPC .................................. 707/812, 809

See application file for complete search history.

(56) References Cited

U.S. PATENT DOCUMENTS

| | | | | |
|---|---|---|---|---|
| 5,987,462 A * | 11/1999 | Kasao et al. | | 707/698 |
| 6,112,279 A | 8/2000 | Wang | | |
| 6,820,122 B1 * | 11/2004 | Mandler et al. | | 709/226 |
| 6,920,477 B2 | 7/2005 | Mitzenmacher | | |
| 7,206,861 B1 * | 4/2007 | Callon | | 709/242 |
| 7,689,661 B2 | 3/2010 | Lowery et al. | | |
| 7,694,076 B2 | 4/2010 | Lowery et al. | | |
| 7,765,560 B2 | 7/2010 | Fresko et al. | | |
| 2002/0026560 A1 * | 2/2002 | Jordan et al. | | 711/120 |
| 2003/0140060 A1 * | 7/2003 | Gehlot et al. | | 707/104.1 |
| 2011/0029672 A1 * | 2/2011 | Agneeswaran | | 709/226 |

OTHER PUBLICATIONS

Peter A. Dinda, Renato J. Figueired, Jose A. B. Fortes: A Case for Grid Computing on Virtual Machines; Technical Report TR-ACIS-02-001; Aug. 2002.*

Kirby, Ted, Getting Started with WebSphere eXtreme Scale, Part 1: Understanding WebSphere eXtreme Scale and how it works, Nov. 4, 2009, IBM.*

Stride, CD, Retrieval of Qualified Variables using Extendible Hashing, IBM Technical Disclosure Bulletin, Dec. 1, 1993, pp. 301-304, vol. 36, No. 12.

\* cited by examiner

*Primary Examiner* — Kannan Shanmugasundaram
(74) *Attorney, Agent, or Firm* — Jordan IP Law, LLC

(57) ABSTRACT

Systems and methods of managing an in-memory data grid (IMDG) may involve conducting a data distribution analysis of the IMDG on a periodic basis, and selecting a hash scheme from a plurality of hash schemes based on the data distribution analysis. In one example, the selected hash scheme is used to conduct a repopulation of the IMDG, wherein the repopulation increases the distribution evenness of database records across the IMDG.

5 Claims, 2 Drawing Sheets

IN-MEMORY DATA GRID HASH SCHEME OPTIMIZATION

CROSS-REFERENCE TO RELATED APPLICATIONS

The present application is a continuation of U.S. patent application Ser. No. 13/115,662 filed on May 25, 2011.

BACKGROUND

1. Technical Field

Embodiments of the present invention generally relate to in-memory data grids. More particularly, embodiments relate to the optimization of hash schemes for in-memory data grids.

2. Discussion

Database systems may use in-memory data grids to store manage across a set of partitioned virtual machines, particularly when the amount of data is relatively large. While such an approach can speed up access to the database, conventional approaches to implementing in-memory data grids may be limited to the use of a single hash scheme to map database records to individual virtual machines. Accordingly, as the database evolves over time, data distribution of data across the partitions may become uneven, wherein an uneven data distribution may in turn have a negative impact on access speed and can increase overall stress on the database.

BRIEF SUMMARY

Embodiments may provide for a computer implemented method in which a data distribution analysis is conducted on an in-memory data grid (IMDG). The method may also provide for selecting a hash scheme from a plurality of hash schemes based on the data distribution analysis.

Embodiments may also include a computer program product having a computer readable storage medium and computer usable code stored on the computer readable storage medium. If executed by a processor, the computer usable code may conduct a data distribution analysis of an in-memory data grid, and select a hash scheme from a plurality of hash schemes based on the data distribution analysis.

In addition, embodiments can involve a computer implemented method in which a data distribution analysis is conducted on an in-memory data grid, wherein the data distribution analysis includes an analysis of a plurality of virtual machines. A hash scheme may be selected from a plurality of hash schemes based on the data distribution analysis, wherein the plurality of hash schemes includes at least one of a content-based scheme and a mathematical scheme. The method can also provide for using the selected hash scheme to conduct a repopulation of the in-memory data grid, wherein the repopulation increases a distribution evenness of database records across the in-memory data grid.

Other embodiments may include a computer program product having a computer readable storage medium and computer usable code stored on the computer readable storage medium. If executed by a processor, the computer usable code can cause a computer to conduct a data distribution analysis on an in-memory data grid, wherein the data distribution analysis is to include an analysis of a plurality of virtual machines. The computer usable code may also cause a computer to select a hash scheme from a plurality of hash schemes based on the data distribution analysis, wherein the plurality of hash schemes is to include at least one of a content-based scheme and a mathematical scheme. Moreover, the computer usable code can cause a computer to use the selected scheme to conduct a repopulation of the in-memory data grid, wherein the repopulation is to increase a distribution evenness of database records across the in-memory data grid.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
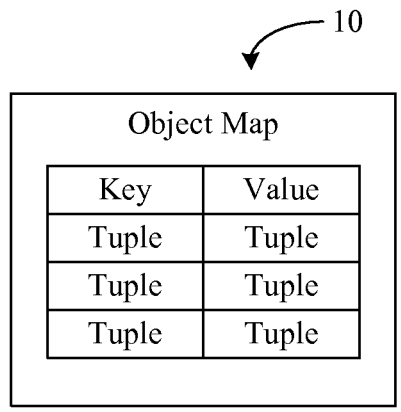
FIG. 1 is a block diagram of an example of an object map according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an object map 10 is shown in which various keys may be mapped to corresponding values. In particular, the illustrated object map 10 represents an ordered list of elements (e.g., tuples) that can enable a data record to be quickly located from its key value. As will be discussed in greater detail, such an approach may be particularly useful in highly distributed architectures involving large databases.

Figure 2:
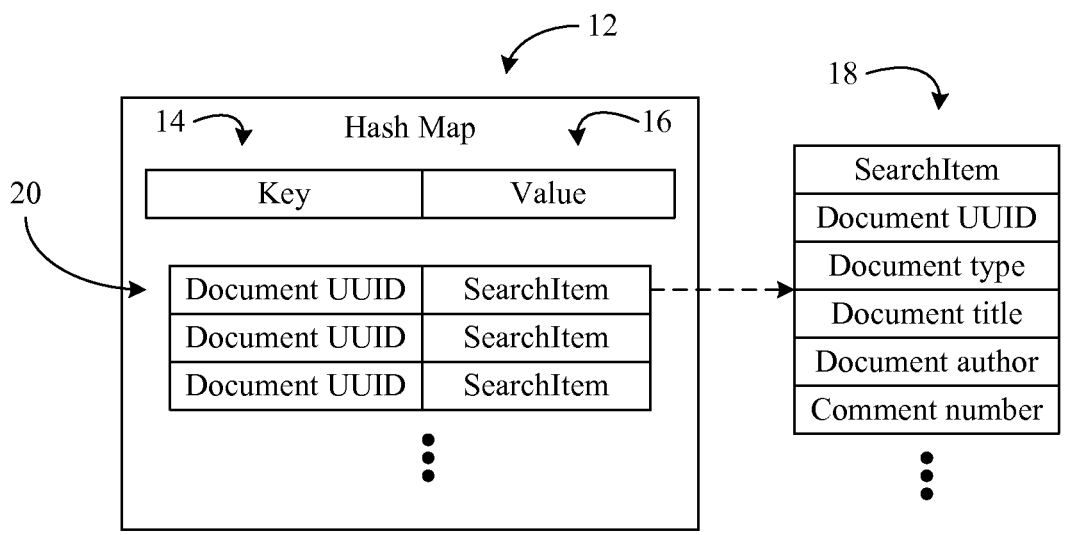
FIG. 2 is a block diagram of a hash map between document identifiers and search items according to an embodiment.

FIG. 2 shows a hash map 12 in which various document UUIDs (universally unique identifiers) are used as keys 14 to calculate hash values 16, wherein applying a hash scheme (e.g., function/algorithm) to each key 14 results in a corresponding hash value 16. For example, a particular key-value pair 20 might provide access to a search item 18 that represents a record (or a portion of a record) in a database, wherein the record could include the document UUID, document type, document title, document author, comment number, and so on. In one example, the records may be stored in an extensible and scalable in-memory data grid (IMDG) that is partitioned into a plurality of virtual machines, wherein the VMs act as "shock absorbers" to a database such as a back end database. As will be discussed in greater detail below, the hash scheme used to determine the hash values 16 can be modified/changed over time in order to ensure sufficient distribution evenness of the database records across the grid/partitions. Such an approach can significantly improve record storage and/or retrieval speed and may reduce overall stress on the database, particularly as the size of the database continues to grow.

Figure 3:
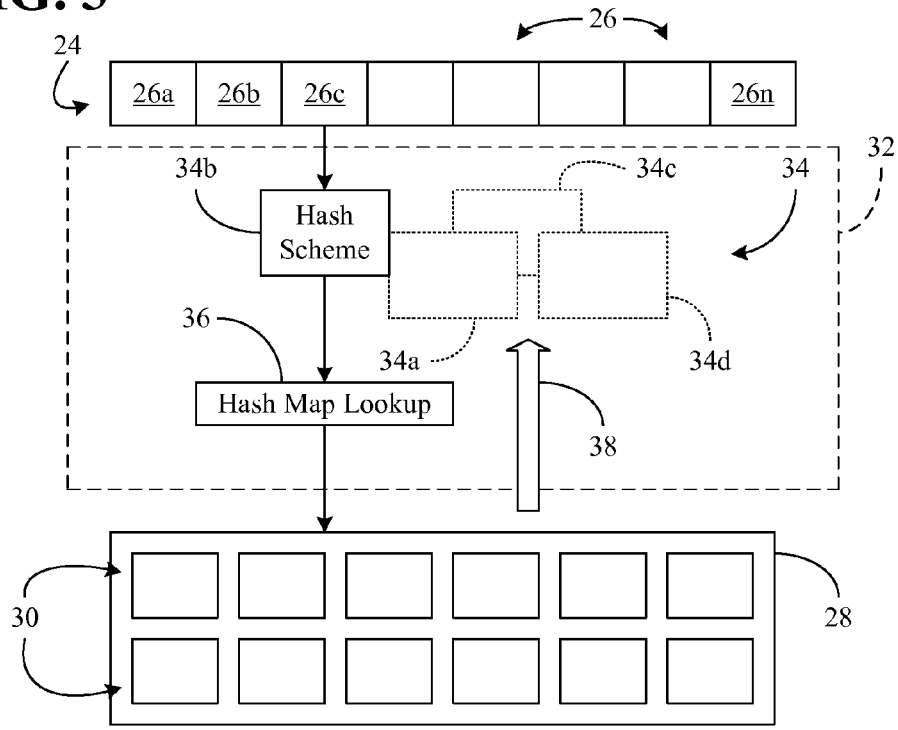
FIG. 3 is a block diagram of an example of a hash scheme selection architecture according to an embodiment.

Turning now to FIG. 3, a hash scheme selection architecture 22 is shown. In the illustrated example, an in-memory data grid (IMDG) 28 is a distributed cache that is partitioned into an interconnected plurality of virtual machines (VMs) 30 functioning as processing elements capable of storing, modifying and retrieving database information located in their respective partitions. For example, a row 24 to be inserted into a database may include various columns 26 (26a-26n) that are grouped together for partitioning purposes (e.g., partitioning columns). In particular, a hash optimization node 32 might identify a hash scheme 34b that is selected from a plurality of hash schemes 34 (34a-34d) and apply the selected hash scheme 34b to a key associated with the partitioning column 26c in order to conduct a hash map lookup 36 for the partitioning column 26c. The results of the hash map lookup 36 can be used to select an individual VM 30 for storing the partitioning column 26c.

For example, the hash scheme can be designed to output a hash value that is an integer, wherein if the hash value is divided by the number of partitions, the remainder will point to the storage partition. Thus, in an IMDG 28 having twelve partitions as shown, a hash value of twenty five divided by twelve would yield a remainder of one, which may cause the partitioning column 26a in question to be stored in the first of the VMs 30. The number of partitions and/or VMs may be fixed or variable, depending upon the circumstances. For example, an IMDG system such as the WebSphere eXtreme Scale (WXS) from IBM Corporation of Armonk, N.Y., could employ a fixed partition approach that is enhanced by the hash scheme selection techniques described herein.

The illustrated hash optimization node 32 uses feedback 38 from the IMDG 28 to select a hash scheme from the plurality of hash schemes 34. In particular, the hash optimization node 32 might conduct a data distribution analysis of the IMDG 28 on a periodic basis in order to ensure that the selected hash scheme results in a sufficiently even distribution of database records across the VMs 30 of the IMDG 28. For example, the hash scheme 34a might be a mathematical scheme (e.g., that adds/subtracts/multiplies one or more portions of the search key), whereas the hash scheme 34b could be a content-based scheme (e.g., that groups similar content together). In such a case, the content-based hash scheme 34b could become less effective at distributing the data, particularly if records added to the database are similar in content. For example, the content-based hash scheme might group records in a contact database according to geographic region, wherein a majority of subsequent records are for the same region. In such a case, a certain partition could become more heavily populated than the other partitions. Thus, the illustrated approach would be able to select a new hash scheme that increases the distribution evenness of database records across the IMDG 28 and repopulate the IMDG 28 according to the new hash scheme.

Figure 4:
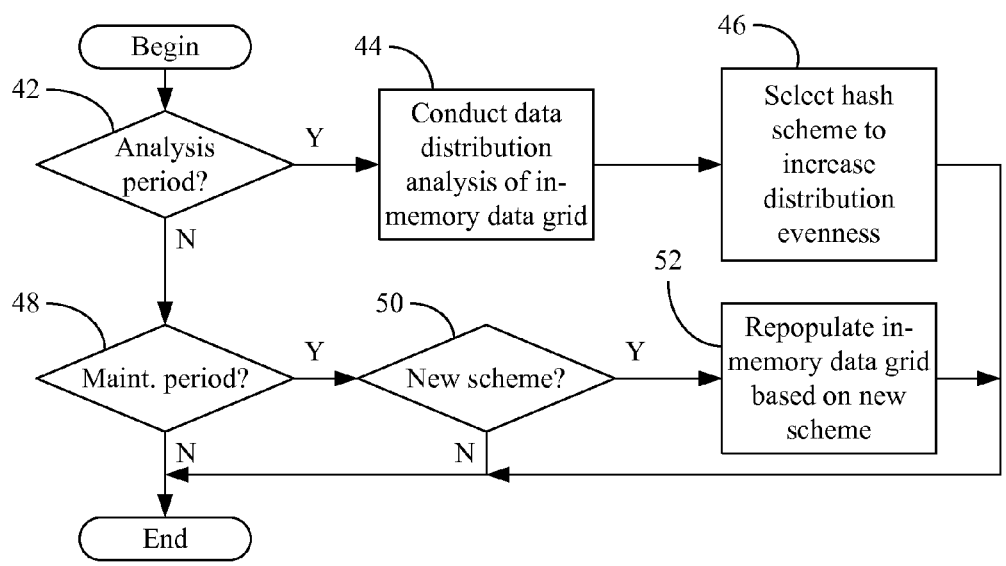
FIG. 4 is a flowchart of an example of a method of controlling data distribution evenness in an in-memory data grid according to an embodiment.

FIG. 4 shows a method 40 of controlling data distribution evenness in an IMDG such as IMDG 28 (FIG. 3), already discussed. Thus, the method 40 might be implemented as logic of a hash optimization node 32 (FIG. 3), also already discussed. In particular, illustrated processing block 42 provides for determining whether a distribution analysis period has expired. The length of the distribution analysis period could be determined based on the activity level of the underlying database. For example, more active databases might have relatively short analysis periods, whereas less active databases could have relatively long analysis periods. If the analysis period has expired, block 44 may conduct a data distribution analysis of the IMDG. The data distribution analysis could involve determining the amount and/or type of data managed by each of a plurality of VMs, as well as performing various calculations such as determining averages and variances of the information collected. A hash scheme that increases/optimizes distribution evenness may be selected at block 46, wherein the selection could take into consideration information known about the various available hash schemes. For example, it may be known that one type of hash scheme is better suited for a particular type of database than another.

If the distribution analysis period has not expired, illustrated block 48 provides for determining whether a maintenance period has expired. If so, a determination may be made at block 50 as to whether a new hash scheme has been selected. If a new hash scheme has been selected, the IMDG can be repopulated at block 52 with the database content based on the new hash scheme. Thus, an IMDG that was previously populated according to a mathematical hash scheme might be repopulated with a content-based hash scheme, or vice versa. Other types of hash schemes, functions, and/or algorithms may also be used. In one example, the repopulation can be constrained to a fixed number of partitions, depending on the system requirements. By scheduling the repopulation to occur during the maintenance period, the illustrated approach minimizes the impact on system performance.

Thus, techniques described herein can provide for an autonomic system that continually analyzes the data distribution in IMDGs. Using a list of pluggable hash schemes, the system can apply the best pluggable hash scheme to ensure even distribution of data across the IMDG. Accordingly, access speed may be increased and overall stress on the database can be reduced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
   conducting a data distribution analysis of an in-memory data grid, the in-memory data grid comprising database content, wherein the data distribution analysis includes an analysis of the amount and type of database content stored by a plurality of virtual machines in the in-memory data grid;
   selecting one hash scheme from a plurality of hash schemes based on the data distribution analysis and information known about the plurality of hash schemes regarding the type of database content the hash schema is better suited, wherein the plurality of hash schemes includes at least a content-based scheme and a mathematical scheme, the mathematical scheme selected when said content-based scheme is less efficient at distributing the data than the mathematical scheme, wherein the mathematical scheme performs a mathematical operation on a search key and wherein the content-based scheme groups similar content together; and
   using only the selected hash scheme to conduct a repopulation of the in-memory data grid to a fixed number of partitions during a maintenance period, wherein the repopulation increases a distribution evenness of database records across the in-memory data grid and the selected hash scheme is used to access data from said in-memory data grid.

2. The method of claim 1, further including repeating the data distribution analysis on a periodic basis.

3. A computer implemented method comprising:
   conducting a data distribution analysis of an in-memory data grid, the in-memory data grid comprising database content, wherein the data distribution analysis includes an analysis of the amount and type of database content stored by a plurality of virtual machines in the in-memory data grid; and
   selecting one hash scheme from a plurality of hash schemes based on the data distribution analysis and information known about the plurality of hash schemes regarding the type of database content the hash schema is better suited, the plurality of hash schemes including at least a content-based scheme and a mathematical scheme, the mathematical scheme selected when said content-based scheme is less efficient at distributing the data than the mathematical scheme, wherein the mathematical scheme performs a mathematical operation on a search key and wherein the content-based scheme groups similar content together; and
   using only the selected hash scheme to conduct a repopulation of the in-memory data grid to a fixed number of partitions, wherein the repopulation increases a distribution evenness of database records across the in-memory data grid; and
   wherein only the selected hash scheme is used to access data from said in-memory data grid.

4. The method of claim 3, further including scheduling the repopulation to occur during a maintenance period.

5. The method of claim 3, further including repeating the data distribution analysis on a periodic basis.

* * * * *